United States Patent [19]

DeVries

[11] Patent Number: 5,721,473
[45] Date of Patent: Feb. 24, 1998

[54] ELECTRIC MOTORIZED VEHICULAR WHEEL WITH ADJUNCTS

[76] Inventor: LeRoy Milo DeVries, P.O. Box 591, Rhinebeck, N.Y. 12572

[21] Appl. No.: 633,686

[22] Filed: Apr. 18, 1996

[51] Int. Cl.⁶ .................... H02P 3/14; H02K 7/00
[52] U.S. Cl. .................... 318/139; 318/376; 318/538
[58] Field of Search .................... 318/139, 375, 318/376, 383, 538, 540

[56] References Cited

U.S. PATENT DOCUMENTS

| | | |
|---|---|---|
| 3,548,965 | 12/1970 | Pierro . |
| 3,897,843 | 8/1975 | Hapeman et al. . |
| 4,799,564 | 1/1989 | Iijima et al. . |
| 4,913,258 | 4/1990 | Sakurai et al. . |
| 5,337,560 | 8/1994 | Abdelmalek . |

*Primary Examiner*—Bentsu Ro

[57] ABSTRACT

Electric motorized vehicular wheels with adjuncts use inside-out motors with interchangeable wire coil stators and interchangeable permanent and electromagnet rotors to roll and stop a load. A 360° auto-steering wheel adjunct uses an inside-out motor with interchangeable stators and rotors attached to a wheel caster adjunct to steer a load. Shock absorption and wheel caster adjuncts regenerate KE continuously from road and tire bumps. Capacitorized hubcap adjuncts hold many kilowatts of electricity to roll, steer, and brake a load while recapturing all available KE from rolling, steering, and braking.

1 Claim, 3 Drawing Sheets

ELECTRIC MOTORIZED VEHICULAR WHEEL WITH ADJUNCTS

BACKGROUND—CROSS-REFERENCE TO RELATED APPLICATIONS

This invention can be retrofitted onto any existing motorized or mechanized vehicle: e.g. a toy, roller skate, bicycle, motorcycle, automobile, truck, tractor, bus, etc. or gear as in a watch, machine or assembly line, but was primarily invented to be assembled with A Capacitorized Chassis— U.S. Pat. No. 5,629,828. Date of Patent: May 13, 1997.

BACKGROUND—FIELD OF INVENTION

This invention is a means whereby any wheel of a motorized or mechanized vehicle: e.g. a toy, roller skate, bicycle, motorcycle, automobile, truck, tractor, bus, or any gear as in a watch, machine or assembly line, is utilized to become an electric motorized vehicular wheel with adjuncts.

BACKGROUND—DISCUSSION OF PRIOR ART

When prehistoric man first invented a wheel, it required the use of manpower to roll and steer a load. For millenia, the only improvement has been the substitution of horsepower, still outside the wheel, to roll and steer a load.

This invention introduces the complete motorization of a wheel. Electricity, instead of horsepower, is used by a motorized wheel to roll and steer a load.

Yesterday's non-motorized wheel could not move itself. There was no electric motor inside. Yesterday's wheel could not steer itself. There was no 360° steering adjunct attached. Yesterday's wheel could not brake itself. There was no electro-magnetic braking inside. Yesterday's wheel could not carry its own energy. There were no capacitorized means or hub-cap adjuncts attached. Yesterday's wheel could not create any of its own energy. There were no attached oscillating electromagnetic wheel caster and shock-absorption adjuncts.

Prior art does not disclose drawings or claims whereby one stator and multiple rotors, without gears or a disc, can roll a load except for two patents. No prior art teaches a wheel which has interchangeable stators and rotors. No prior art teaches a motorized wheel can steer itself 360°. No prior art teaches a motorized wheel can be retrofitted onto any present vehicle.

In a French patent, an integral electric motor invented by Bruyant, Guy, FR-2561-593-A, Sep. 27, 1985, uses a brushless motor configuration with field fixed to axle to drive a road wheel. Its windings are fixed to the axle and are not interchangeable. Its permanent rotors are not interchangeable. The wheel cannot steer itself. The wheel has no braking capability. The wheel cannot carry any of its own energy. The wheel cannot create any of its own energy. This wheel cannot be retrofitted onto any other combustion engine vehicle.

In U.S. Pat. No. 3,548,965, Dec. 22, 1970, John Pierro claims a gearless drive with a linear synchronous motor and a cylindrical interdigitated rotor. The description includes separate field and stator coils which are not interchangeable. None of the magnets are interchangeable. The wheel cannot steer itself. It cannot brake itself. This wheel does not carry its own energy supply or create any of its own energy. This wheel cannot be retrofitted onto any other vehicle.

An electric motorized wheel, U.S. Pat. No. 3,897,843 to Hapeman, Aug. 5, 1975, had more than two reversible gears.

An electric wheel drive, U.S. Pat. No. 4,799,564 to Iijima and Itami, Jan. 24, 1989, had a motor, drive shaft, a second stage star-type reduction gear, and a first stage planetary reduction gear.

An electric vehicle patent, U.S. Pat. No. 4,913,258 to Hiroshi Sakurai, Apr. 3, 1990, describes a wheel attached to a wheel disc attached on its outer side to a motor that is fastened to the hub by bolts on the outside of the wheel. The disc plate functions as a gear that rotates the wheel itself. The wheel, the disc, and the attached motor are three separate entities. There are no variable interchangeable parts in this invention. There are mechanical brakes but with no regenerative kinetic energy (KE) capability. There is no steering mechanism. This wheel cannot be retrofitted onto any other vehicle.

In U.S. Pat. No. 5,337,560, Aug. 16, 1994, Fawzy Abdelmalek claims a shock-absorber apparatus for an electric motor vehicle which contains a rod mechanism that converts orbiting motion to rotary motion so an attached generator can recover energy from road oscillations. The rod mechanism is separate and distinct from the generator.

An electric motorized wheel with an electro-magnetic shock-absorption adjunct and a wheel caster adjunct, interchangeable permanent magnets, and an interchangeable wire coil replaces the rod and attached generator. These magnets and coils are KE-creating adjuncts but are one structure replacing two separate entities.

No prior art could be found for oscillating electromagnetic shock-absorption and wheel caster adjuncts attached to a motorized wheel to recapture KE.

No prior art could be found for a 360° auto(self)-steering adjunct attached to a motorized wheel.

No prior art could be found for recapturing all of the KE from a hard stop. GM's Impact electric vehicle uses anti-lock brakes to complete a hard stop but this braking does not regenerate any KE. Only during Impact's coasting, do motor magnets and coils regenerate 25% of reusable power from KE. However, during the rotation of an electric motorized wheel, when polarities of highly incited electro-magnets are reversed, a sudden forced hard stop will occur. Then magnets and a wire coil can recapture all of the KE of a sudden forced stop.

Prior art in publications reveal two major problems in present electric vehicles. (1) When a conventional axle-type rotor motor drives, via gears, a much larger circumference wheel, the strain and the heat become too great and the motor overheats and can be destroyed. With a 10 to 1 mechanical advantage (MA), an inside-out air-cooled motor inside an electric motorized wheel does not suffer from overheating. (2) When conventional batteries are used in an electric vehicle and regeneration of KE is desired, a sudden hard stop at 60 mph will regenerate over 40,000 watts in six seconds and batteries will explode. Only a capacitorized hubcap adjunct or a capacitorized chassis can safely and continually hold that sudden surge of KE current that can be regenerated from incited electro-magnets, permanent magnets, and a wire coil during a sudden hard stop at 60 mph.

OBJECTS AND ADVANTAGES

Electric vehicles (EVs) have tremendous advantages over combustion engine vehicles.

(1) Electric vehicles need no combustion engine, transmission, drive shaft, differential, gears, axles, gas tank, radiator, and belts.

(2) Electric motors cause no pollution for city streets or country roads.

(3) Electric motors are durable with basically no upkeep and can last for years.

A state of the art electric vehicle needs only four interchangeable, sectionalized, extendable, individualized entities:

(1) an interchangeable, sectionalized, extendable to any length, aerodynamic carriage,
(2) an interchangeable, sectionalized, extendable to any length, capacitorized chassis,
(3) four or more electric motorized vehicular wheels with adjuncts with interchangeable components,
(4) an up and down and/or rotating throttle stick has a 360° acceleration and braking knob on the top, and on the bottom, a capacitorized control box to send electric impulses via wire to capacitorized hubcaps or sectionalized capacitorized chassis.

Motorized wheels have no gears. Motorized wheels have only interchangeable magnet rotors and an interchangeable wire coil stator. Within minutes, by interchanging either rotors or a stator or both, the same wheels can now drive an EV much faster or when pulling a heavier load much easier with far greater torque. This versatility is unknown in any other electric vehicle.

Acceleration: Each motorized wheel has at least three interchangeable road-driving permanent magnets and three interchangeable accelerating or braking electro-magnets and one interchangeable wire coil inside an inside-out electric motor.

With a downward push on a throttle stick, an impulse will be sent by wire to a capacitor, which will incite a stator to push permanent magnet rotors faster and an EV will accelerate slowly. Lift the throttle stick to neutral and an EV will coast, regenerating KE current for storage in hubcap adjuncts.

For inciting electro-magnets, a clockwise/counterclockwise knob is attached to the top of a throttle stick. When the knob is turned clockwise, an impulse by wire will incite electro-magnets causing rapid acceleration. Returned to neutral, an EV will coast. When the knob is turned counterclockwise, the polarity of electro-magnets reverse and powerful electro-magnetic braking begins.

Steering: For ordinary road steering, when a throttle stick is rotated toward one of the four motorized wheels and its top knob is turned counterclockwise, the polarity of that wheel will reverse and the wheel will slow down. Then the other wheels will push the EV toward that direction. No steering wheel is needed.

An additional steering mechanism is a 360° auto-steering motorized wheel adjunct. Optional photo cells or cameras focused on the center strip of a highway and the outer line of a pavement or road reflectors could steer an EV automatically. A photo cell could also brake electro-magnets if danger appeared upfront or accelerate the electro-magnets if danger approached from the rear.

Parking: Parallel parking is simplified. Approach the parking area parallel. Turn the four motorized wheels with the auto-steering adjunct 90° and drive in.

Backing up: Turn the auto-steering adjunct 180° and drive backward.

A safety feature: Motorized wheels with their attached adjuncts are heavier than ordinary wheels. With light EV wheels, slippage off the edge of the road could crash an EV. Heavy motorized wheels and an inside-out motorized steering adjunct would automatically steer or hold and control the vehicle and prevent the crash.

Braking: Total regenerative braking of a 60 mph hard stop depends more upon the ability of capacitorized hubcaps and sectionalized capacitorized chassis to hold the charges than the actual natural electro-magnetic making of the charges.

In junk yards, cranes with incited electro-magnets have enough magnetism to grab instantaneously, lift and hold permanently thousands of pounds of metal.

When a throttle stick is in neutral, and an accelerating/braking knob is turned counterclockwise, the polarity of the electro-magnets reverse and powerful electro-magnets begin braking.

The first second is response time. The permanent magnets are already coasting and slowing the rotation of the wheels while regenerating current. The second second, the electro-magnets are incited in reverse polarity and huge amounts of KE are regenerated. The third second, the incitement doubles in strength and the motorized wheel rotates at 45 mph. Each second the incitement doubles, the braking slows the rotations by 15 mph and more KE is regenerated. Depending upon response time, motorized wheels can stop an EV in six seconds. No brakes are needed. Depending upon mass of the EV, up to 100,000 watts are regenerated during the six seconds from one hard stop, yet the wheels, because of road friction, must continue to rotate up to the last split second. However, only capacitorized hubcaps or a sectionalized chassis can process that huge amount of current created in those six seconds of a hard stop.

Carrying charges: Motorized wheels may have two capacitorized hubcaps. One may be attached to a front side of a wheel caster adjunct and the second one to the other side. Two capacitorized hubcaps in parallel can hold or be charged with 8 kWh of electricity from an electric household outlet or from regenerative KE. An EV with four motorized wheels and eight capacitorized hubcaps can carry enough charges for four hours of driving without ever installing other capacitorized chassis sections. Most, if not all, of sectionalized capacitorized chassis are only needed for longer trips.

Creating charges: There are two separate current-creating adjuncts. One is an electro-magnetic shock-absorption adjunct. The other is an electro-magnetic split-fork appendage wheel caster adjunct.

A shock-absorption adjunct absorbs the bumps in a road while holding a carriage/chassis level. Road bumps raise permanent magnets upward through a coil, then resistance from a carriage/chassis forces the permanent magnets back through the coil creating alternating current.

The split-fork wheel caster has interchangeable permanent magnets and a coil on each side of an appendage. Man-made tire bumps supply a continual up and down motion forcing the permanent magnets through a long coil, creating alternating current with each rotation of a wheel.

Retrofitting: There is no prior art of any other motorized wheel that can be retrofitted onto any existing entity of similar size and kind that uses wheels to roll a load and can perform exactly as this invention envisions; that is, to electrically roll a load without gears by an inside-out motor with magnets and a coil mounted inside a tire. An inside-out motor housing is the actual rotating rim of an attached tire.

Remove all adjuncts from a motorized wheel including a wheel's stationary axle and this motorized wheel can be retrofitted onto any similar-sized entity with a non-rotating wheel axle: e.g. a rear wheel axle of a front-wheel drive vehicle.

BRIEF DESCRIPTION OF THE DRAWING FIGURES

DESCRIPTION OF INVENTION FIGS. 1 TO 5

Figure 1:
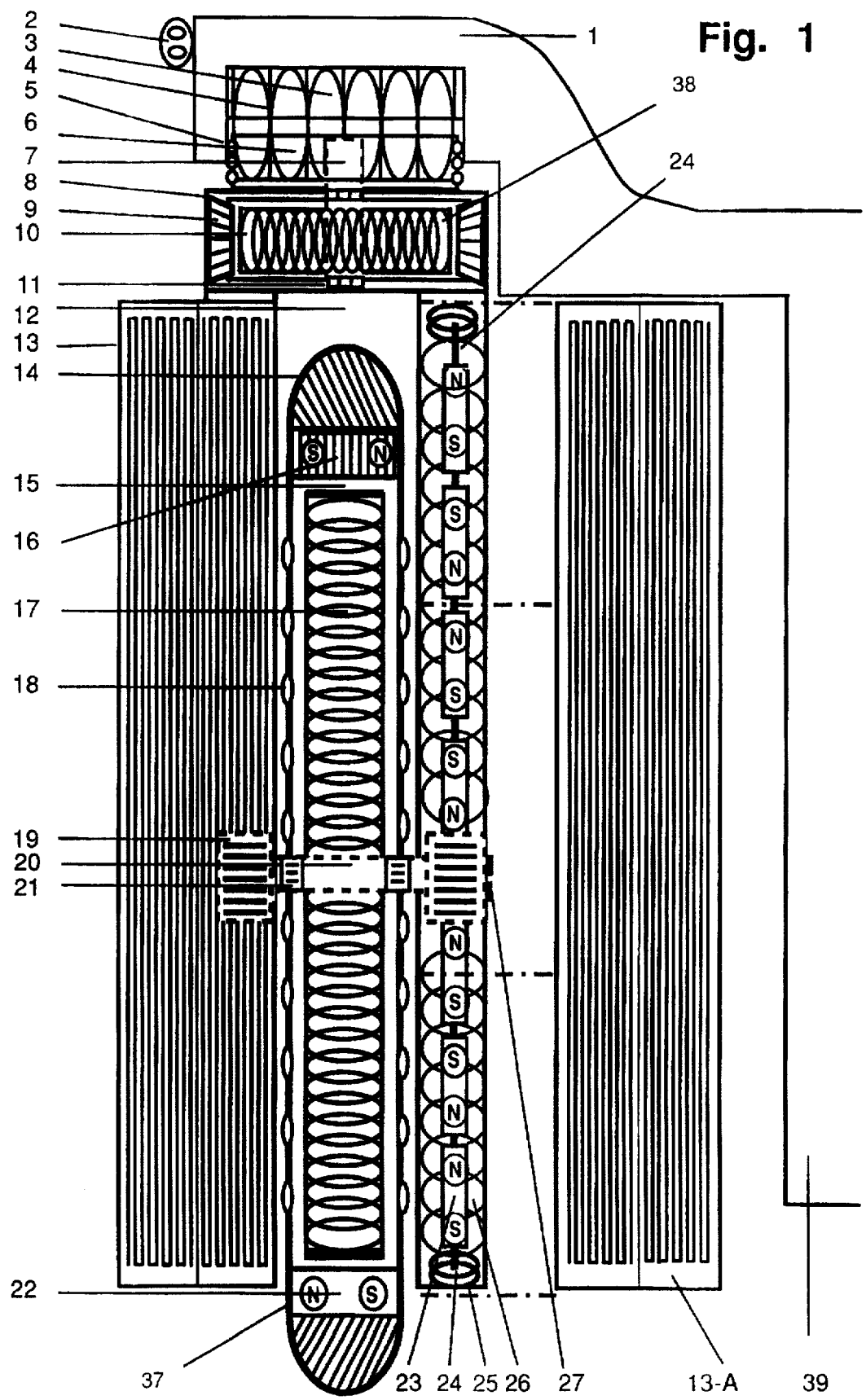
FIG. 1 shows components of an electric motorized vehicular wheel with adjuncts, a corner truss from a capacitorized chassis, and one attached hubcap adjunct and one hubcap with an exploded view.

FIG. 1 shows an extension truss 1 of a sectionalized capacitorized chassis 39, not fully shown, with an attached photo cell or camera 2 to identify various driving conditions and make the EV react automatically to each situation.

A permanent magnet 3 is sealed inside an extension truss corner 1. A current-creating wire coil 4 encloses both the permanent magnet 3 of the truss and the permanent magnet 6 of a shock-absorption adjunct. With magnetically opposed flux lines in the space between the two permanent magnets 3 and 6, magnet 6 will oscillate and move closer to flux lines of magnet 3 creating alternating current inside wire coil 4 as road bumps are being absorbed.

A stationary axle 7 permits an auto-steering motorized wheel adjunct housing 8 to rotate 360° on bearings 11.

Electro-magnet rotors 9 can rotate an inside-out motorized auto-steering adjunct 38 up to 360° when a wire coil stator 10 is incited proportionally.

A wheel caster adjunct 12 can be rotated 360° because it is attached to a wheel adjunct housing 8. Wheel caster adjunct 12 supports a motorized wheel 37.

An interchangeable capacitorized hubcap 13 is attached to one fork appendage of a wheel caster adjunct 12. Shown as an exploded view, the other interchangeable capacitorized hubcap 13 A is attached to a right side fork appendage of a wheel caster adjunct 12.

A tire with man-made bumps 14 is mounted on a rotating rim 15 with air intake openings 18 that rotates on a roller bearing 21 that surrounds a stationary wheel axle 20. A roller bearing enclosure 19 permits the wheel axle 20 to oscillate a piston rod 24 inside a coil 26 up and down with each tire bump.

Inside a motorized wheel's rotating rim 15 is shown one of three electo-magnet rotors 16 opposite of one of three permanent magnet rotors 22.

A split-fork wheel caster adjunct 12 has interchangeable permanent magnets 23 attached to a piston rod 24 that continually oscillate inside a long interchangeable wire coil 26 creating alternating current from tire bumps.

Bolts 27 when unscrewed permit a cover plate to be removed. Then the complete axle assembly 19 and 20 can be disassembled and a motorized wheel can be retrofitted, in minutes, onto another vehicle 31 of similar size and kind.

Figure 2:
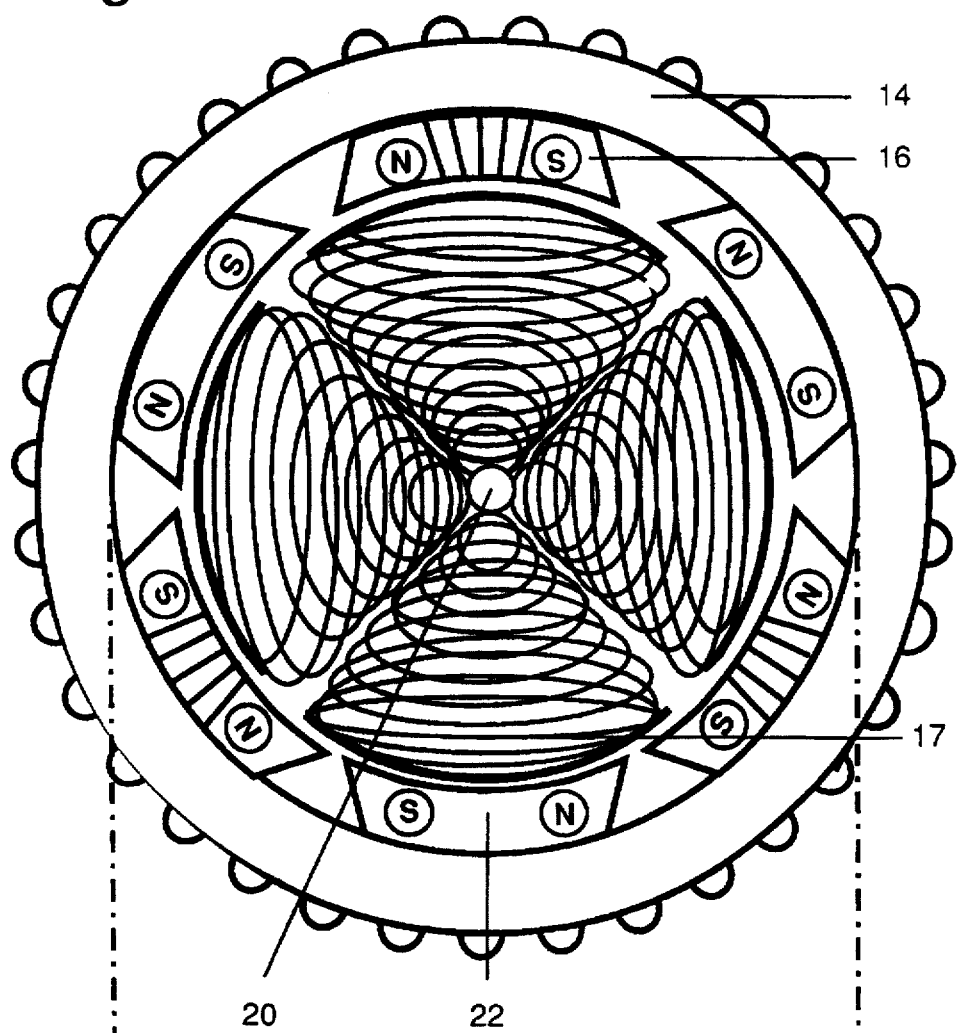
FIG. 2 shows a side view of an electric motorized vehicular wheel.

FIG. 2 shows a tire with bumps 14. When the electromagnets 16 are magnetized and incited by the wire coil stator 17, a wheel accelerates very fast. When polarities of electro-magnet rotors 16 are reversed by current from a capacitorized hubcap, a motorized wheel will brake itself automatically.

Permanent magnet rotors 22 when incited by a stator coil 17 will drive the motorized wheels forward. When the wire coil stator 17 is non-incited, wheels will coast. Permanent magnet flux-lines will regenerate current in coil 17 while wheel slows. As an EV slows or stops, motorized wheels regenerate KE in joules equal to ½ mass times velocity squared.

Figure 3:
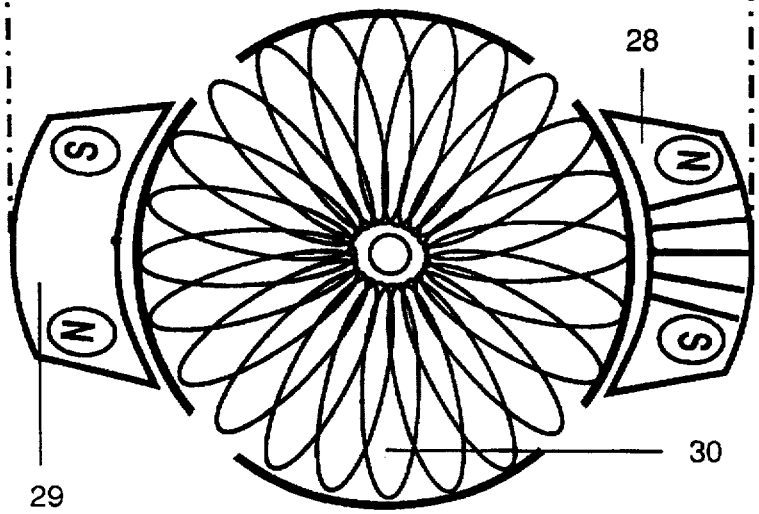
FIG. 3 shows a larger interchangeable permanent magnet, a larger interchangeable electro-magnet, and a larger interchangeable wire coil stator.

FIG. 3 shows a larger interchangeable electro-magnet rotor 28, a larger interchangeable permanent magnet rotor 29, and a larger interchangeable wire coil stator 30. As the size of rotors and a stator are increased, they produce a greater torque and, therefore, will pull a heavier load.

Figure 4:
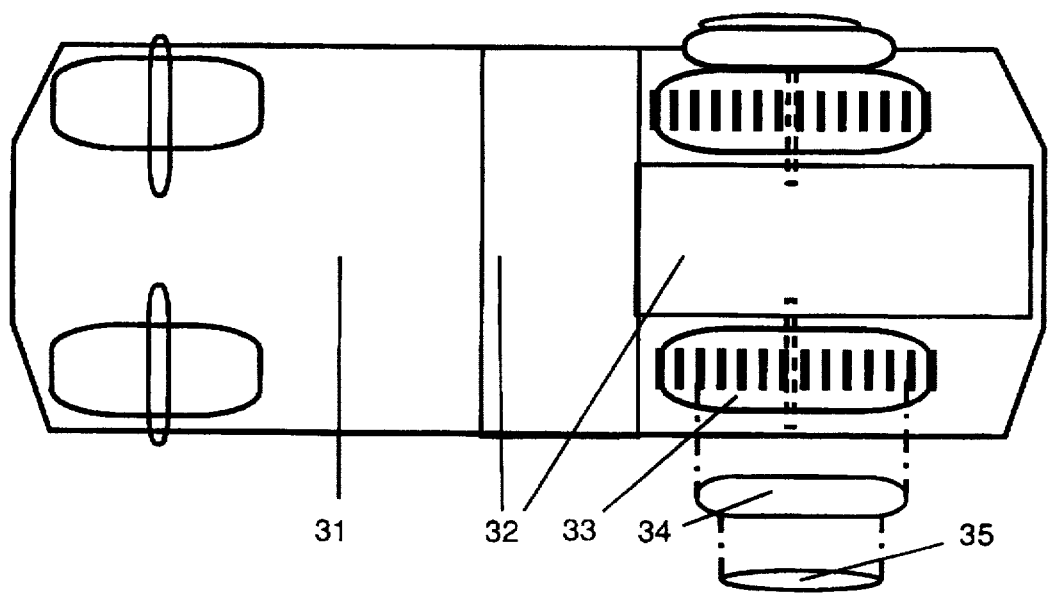
FIG. 4 shows an underside of a regular combustion engine vehicle with two electric motorized vehicular wheels with adjuncts retrofitted onto vehicle's two regular stationary rear axles.

FIG. 4 shows a combustion engine vehicle 31 that has been retrofitted with electric motorized wheels without axles 33. A smaller interchangeable capacitorized hubcap 34 and a capacitorized control box 35 have been attached to retrofitted electric motorized wheels without axles 33.

Interchangeable capacitorized sections 32 of a capacitorized chassis have been retrofitted to an underside, or inside a trunk, of a combustion engine vehicle 31.

Figure 5:
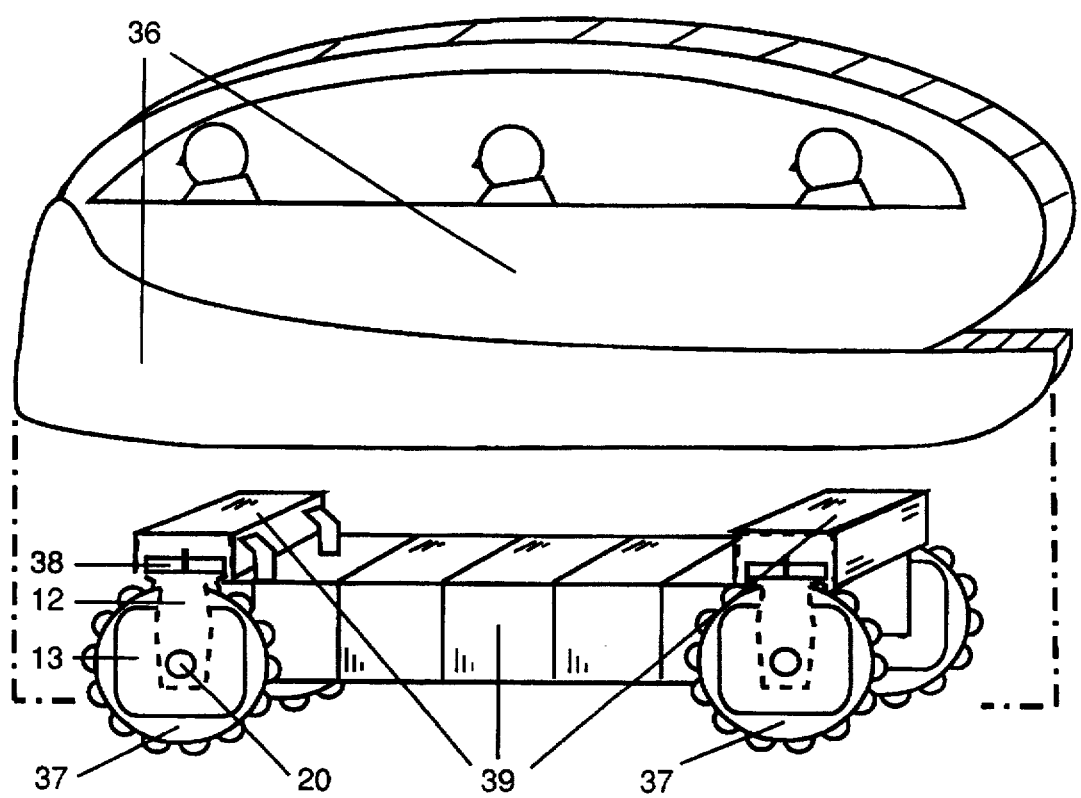
FIG. 5 shows an exploded view of a sectionalized interchangeable carriage whose sectional lines are not shown, a sectionalized capacitorized chassis with sectional lines shown, and four electric motorized vehicular wheels with adjuncts.

FIG. 5 shows an interchangeable sectionalized carriage 36. The division lines of a sectionalized carriage are not shown. A front section, multiple middle sections, and a back section are connected together into any desired length.

Any number of electric motorized vehicular wheels with adjuncts 37 may be inserted into corner truss openings 1 of multiple interchangeable sectionalized capacitorized chassis sections 39.

OPERATION OF INVENTION

An unique operation of electric motorized vehicular wheels with adjuncts 37 is to roll a load, without gears, using three or more interchangeable permanent magnet rotors 22 with an interchangeable capability to insert more powerful permanent magnet rotors 29 and three or more interchangeable electo-magnet rotors 16 with an interchangeable capability to insert more powerful electro-magnet rotors 28. This technology of interchangeable, insertable rotors is unique for electric motors and EVs.

An interchangeable wire coil stator 17 with an interchangeable capability to insert a more powerful stator coil 30 on a wheel's stationary axle 20 is also a new technology for electric motors and is operationally unique.

Another unique operational capability of electric motorized wheels features three electro-magnet rotors 16 or 28 to brake a rolling load suddenly and safely. When electromagnet rotors 16 or 28 are incited with reverse polarity by a capacitorized hubcap 13 assisted by a magnetic drag of the three permanent magnet rotors 22 or 29, they become a very powerful anti-lock braking system.

An electric motorized wheel with adjuncts 37, that can steer itself automatically with a photo-camera cell 2 or manually with a knob-trottle stick, are unique operational features. Attached to the top of a wheel caster adjunct 12 is a housing 8 of a 360° auto-steering adjunct 38. An auto-steering adjunct turned 90° by all four motorized wheels permits an EV to parallel park with only a sideways motion. No other known vehicle has these unique operational features.

Two additional adjuncts, a shock-absorption adjunct with permanent magnets 3 and 6 oscillating through a wire coil 4 and a wheel caster adjunct with permanent magnets 23 attached to a rod 24 that oscillates through a wire coil 26 create alternating current.

Interchangeable capacitorized hubcap adjuncts 13 and 13A and/or interchangeable capacitorized chassis sections 39 can hold, and/or regenerate from KE, enough kilowatt/hours to drive an EV for many hours.

A very important operational feature for today's vehicles: two or more electric motorized wheels 37, without shock-absorption components 3, 4, 5, 6, 7, without a 360° auto-steering adjunct 38, without a wheel caster adjunct 12, and without a wheel axle 20, can be retrofitted onto any other kind of vehicle.

A fossil fuel vehicle becomes an electric hybrid when its regular, non-driving wheels are removed from their stationary axles and these axles are retrofitted with electric motorized wheels with attached capacitorized hubcap adjuncts. Each hubcap has an attached capacitorized control box wired to a driver's knob throttle stick.

Only three alterations are necessary for a hybrid engine/electric motor conversion.

1. Electric motorized wheels with capacitorized hubcap adjuncts must be retrofitted onto pre-existing stationary axles.
2. A capacitorized control box wired directly to a driver's knob throttle stick.
3. Optionals: Additional capacitorized hubcap adjuncts or trunk-size capacitorized chassis sections are placed in a trunk or capacitorized sections are retrofitted underneath on a frame.

SUMMARY, RAMIFICATIONS, AND SCOPE OF INVENTION

Electric motorized wheels with adjuncts attached to a capacitorized chassis are the only major components needed to roll a load, steer a load, stop a load, supply and create some of its own energy. A carriage, a driver, and a knob throttle stick attached to a capacitorized control box are the other components necessary. Simplicity is the key to efficiency. A vehicle with only five different entities to do five different things, without gears, is state of the art.

Electric motorized wheels can be retrofitted onto any moving entity in the world. Miniaturized motorized wheels with a miniaturized capacitorized chassis can be made to fit toys, roller skates, bicycles, and motorcycles.

Manufactured motorized wheel kits can be made available to children or adults to assemble the wheels and then retrofit the wheels onto any existing moving entity.

Maximized motorized wheels can be designed to fit large automobiles, recreational vehicles, trucks, tractors, buses, and trains.

Replace tires with propellers and motorized wheels can propel an all-electric boat. Capacitorized chassis sections can be designed as a boat's hull.

Retrofitted with motorized wheels and motorized wheel propellers and retrofitted with attachable capacitorized wing, tail, and fuselage sections, an EV can become an electric airplane.

I claim:
1. An electric motorized vehicular wheel with adjuncts comprising:
    a tire and rim rotor which includes a plurality of oppositely placed interchangeable permanent and electro magnets that rotate said tire and rim rotor by means of an electric field excited by an interchangeable wire coil stator secured onto a stationary axle;
    a capacitorized adjunct for energizing said wire coil stator within said tire and rim rotor for acceleration and for recapturing kinetic energy upon deceleration;
    a shock-absorption adjunct comprising a housing, a wire coil within said housing and a stationary permanent magnet attached to upper level and an oscillating permanent magnet attached to lower level that is connected to steering adjunct;
    a 360° steering adjunct adjacent to said tire and rim rotor including a wire coil and a plurality of electro magnets;
    a caster adjunct comprising a housing, a coil within said housing and an oscillating rod positioned within said coil to which a plurality of permanent magnets are attached.

* * * * *